Dec. 11, 1928.

J. ZWICKY 1,694,610

PUMP

Filed Aug. 11, 1923

INVENTOR.
Jean Zwicky
by
Attorney.

Patented Dec. 11, 1928.

1,694,610

UNITED STATES PATENT OFFICE.

JEAN ZWICKY, OF LONDON, ENGLAND.

PUMP.

Application filed August 11, 1923, Serial No. 656,934, and in Great Britain April 3, 1923.

This invention relates to pumps, and its main purposes are to lessen the cost of manufacture, and to increase the maximum lift the pump is capable of giving.

With the first of these purposes in view the pump has been so designed that most of its parts can be produced by stamping or pressing. Only the cylinder body need be cast. This comprises the cylinder proper, the valve chest with valve seatings, and inlet and outlet fittings to which pipes can be attached. The interior of the cylinder, the valve seatings, and in some cases—depending on the nature of the pipe attachment—the inlet and outlet fittings have to be machined. To lessen the expense of machining the cylinder body is so designed that it may be mounted on a capstan in a machine tool, and all the necessary machining operations may be performed upon it without other movement than successive rotations of the capstan to bring the several surfaces to be machined into position to be worked upon. For this purpose the surfaces to be machined must all be parallel or at right angles to lines meeting on the capstan axis. The surfaces of the valve seatings and of the pipe fittings are therefore so placed that axial lines through them meet in a common point upon the cylinder axis.

In a specific construction of cylinder body the valve chest is located above the cylinder, and the valve seatings are set at an inclination to the axis of the cylinder with their lower edges as close as possible to the ends of the cylinder. By this means the clearance is reduced and high lift rendered possible. The inlet and outlet valves for each end of the cylinder are co-axial, the axes of the two pairs of valves meeting, as stated, on the cylinder axis. Access is had to the valve seatings for machining through openings co-axial with them in the wall of the valve chest; and these openings are covered by caps held in place by a yoke and screw. To economize space, both in the clearance space and generally the outlet valve forms a guide for the stem of the inlet valve, and is itself guided in the cap which retains it.

Constructions according to the invention are illustrated in the accompanying drawings.

Figure 3:
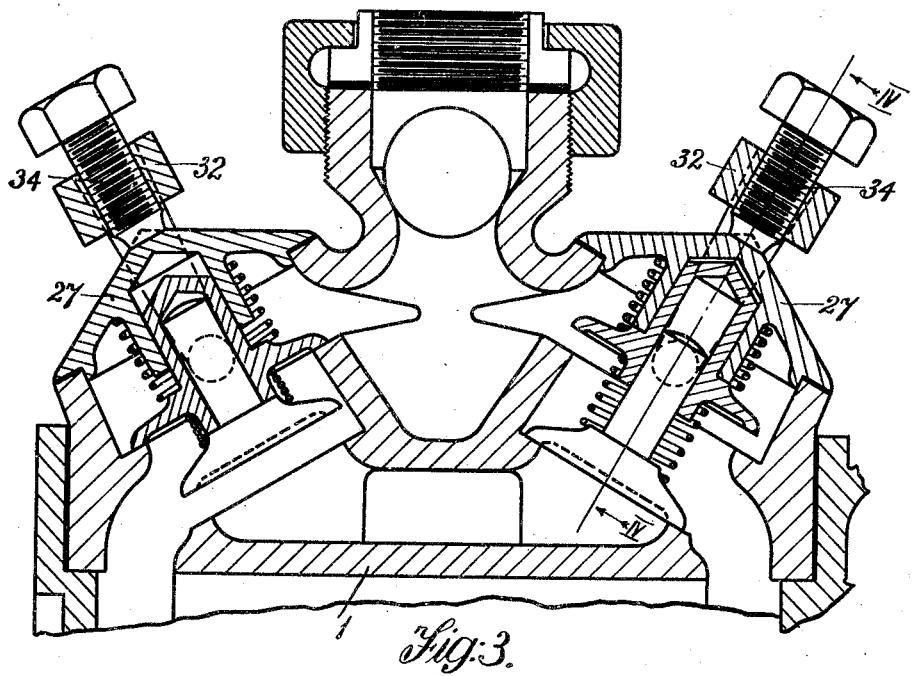
Figure 3 is a part longitudinal section of a modification.
Figure 4:
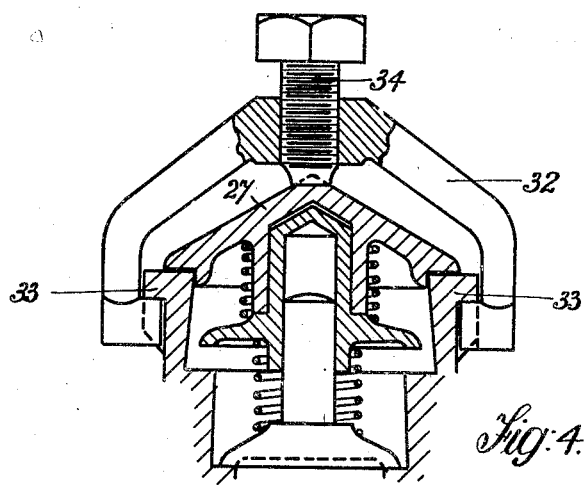

Figure 4 a section on the line IV—IV of Figure 3.

The cylinder body comprises a cylinder 1, a valve chest 2 with valve seatings in it, and inlet and outlet fittings 3, 4. This is one casting. The cylinder is closed at one end by a cover plate 5 which is a simple stamping, and at the other end by a cover plate 6 recessed at 7 to receive a gland, and having extensions 8 and 9 to receive the gland abutment and the operating handle respectively. There is also a drain passage 17 through the cover plate 6 which normally is closed by a plug 18. This cover plate though of more complex form than the plate 5 can yet be formed by pressing. The piston is formed of two stampings 10, 11, one fitting a coned portion of the piston rod 12, and the other screwing upon the reduced end of the rod. These clamp between them cup leathers 13, and they have projections 14 which prevent the cup leathers passing beyond the edge of the cylinder ports 15, 16. The piston rod is connected by links 19 to a handle socket 20 pivoted on the projection 9 and adapted to receive a lever of suitable length.

The pump shown is double-acting. There are therefore two inlet and two outlet valves. At each end of the cylinder the seatings 21, 22 for the inlet and outlet valves are formed in the valve chest parallel to each other and but a short distance apart, and inclined to the cylinder axis This inclined position enables the lower edge of the seatings to be brought close to the end of the cylinder, so that the clearance space is reduced. Access is had to the seatings for machining, and the valves are placed in position, through openings 23 in the wall of the valve chest.

The machining operations requisite on this casting are the turning of the cylinder, the facing of its ends to receive the plates 5, 6, the facing of the valve seatings and of the edges of the openings 23, and, in some cases, the facing or tapping of the inlet and outlet fittings 3, 4.

Figure 1:
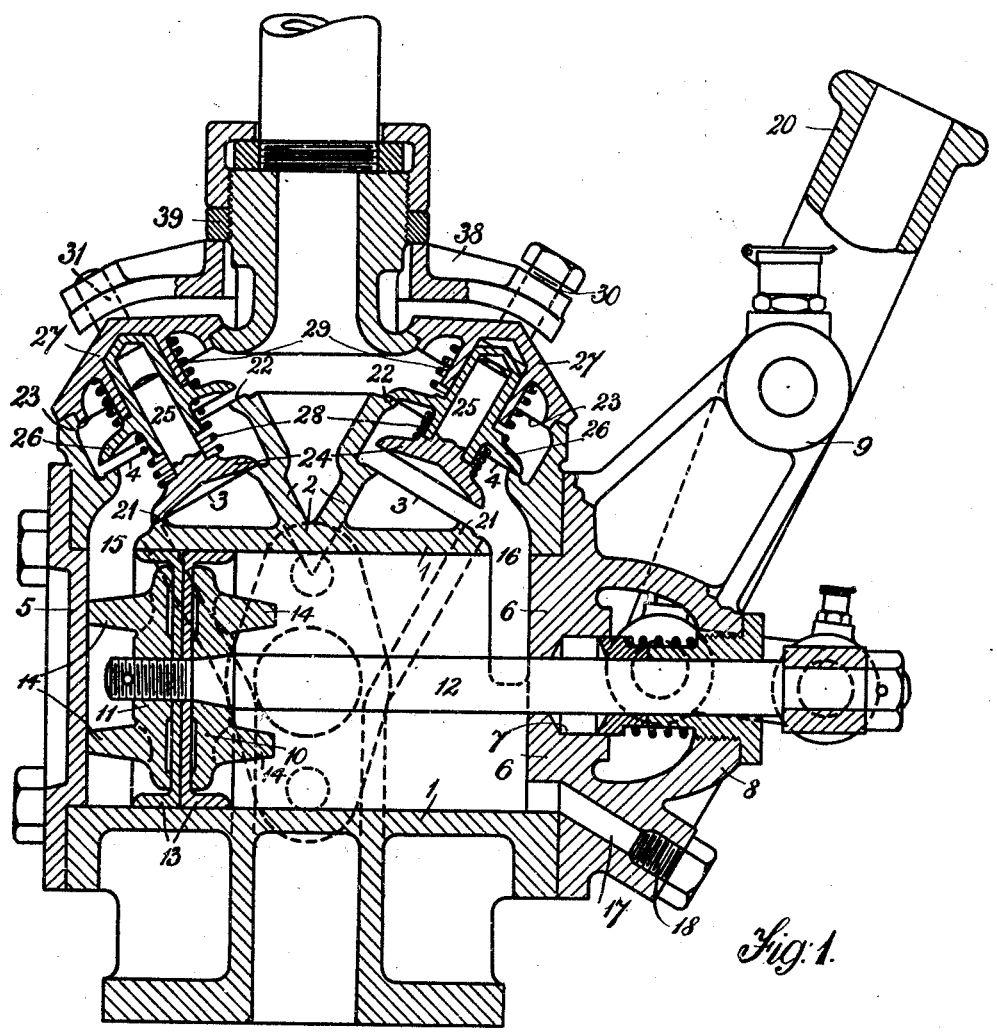
Figure 1 is a longitudinal section and Figure 2 an end elevation of one construction.
Figure 2:
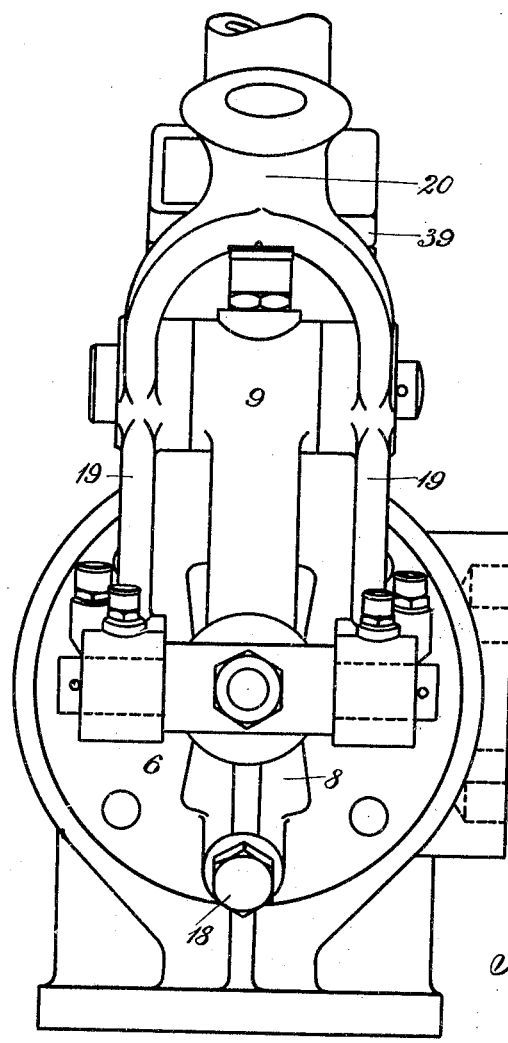

The surfaces with which the cover plates make joint are at right angles to the cylinder axis. The axes of the two sets of valve and cap seatings 21, 22 and 23 meet upon the cylinder axis where that axis is intersected by the axes of the inlet and outlet fittings 3, 4. Thus all the surfaces to be machined are either parallel or at right angles to lines proceeding from a common point. Immediately the inlet fitting 3 has been turned the casting can be mounted upon a capstan with this inlet co-axial with the capstan. The cylinder can then be bored and its end surfaces simultaneously machined to take the cover plate. By then turning the casting through an angle one set of seatings 21, 22 and the edge of the corresponding opening 23 can be machined, the tools working on the surfaces 21 and 22 passing through the opening 23. A further turn enables the outlet fitting 4 to be machined if necessary; and yet another turn brings the second set of ports 21, 22 and the second opening 23 into position for machining. The inlet valve 24 has a stem 25 which slides in and is guided by the hollow stem of the outlet valve 26. This hollow stem in turn moves in a recess in the cap 27. A spring 28 is interposed between the two valves and a spring 29 between the outlet valve and the cap, by which means the valves are normally kept on their seatings. The cap in turn is kept in position by a yoke. In the construction shown in Figures 1 and 2 one yoke 38 serves for retaining both of the caps in position. It is held down by a nut 39 upon the outlet fitting 4 and carries set screws 30 or studs 31 abutting upon the caps 27.

In the alternative construction shown in Figures 3 and 4 each cap 27 has its own yoke 32 which engages beneath a flanged portion 33 of the cylinder body and carries a set screw 34 bearing on the cap.

Figure 3 shows the use of a non-return ball valve in the outlet opening which is formed as a seating for it.

I claim—

1. In a pump a cylinder body, comprising a cylinder proper, inlet and outlet fittings, and seatings for tappet valves, the machined surfaces of said seatings being at right angles to lines meeting in a common point on the cylinder axis.

2. In a pump a cylinder body, comprising a cylinder proper, inlet and outlet fittings having their axes intersecting the cylinder axis in the same point, and seatings for tappet valves, the machined surfaces of said seatings being at right angles to lines meeting at the intersection of the axes of the inlet and outlet fittings.

3. In a pump a cylinder casting comprising a cylinder proper, a valve chest integral therewith having fluid passages therein communicating with the ends of the cylinder, and valve seatings formed in said chest inclined to the axis of the cylinder and at right angles to axes meeting on the axis of the cylinder.

4. In a pump a cylinder casting comprising a cylinder proper, a valve chest integral therewith having fluid passages therein communicating with the ends of the cylinder, and co-axial pairs of valve seatings formed in said chest inclined to the axis of the cylinder and at right angles to axes meeting on the axis of the cylinder.

5. A cylinder and valve chest casting for a reciprocating pump having the axes of all its machined surfaces meeting in a common point.

In testimony whereof I have signed my name to this specification.

JEAN ZWICKY.